US011118023B2

(12) United States Patent
Gerard et al.

(10) Patent No.: US 11,118,023 B2
(45) Date of Patent: *Sep. 14, 2021

(54) PREFORM, ITS METHOD OF PREPARATION AND ITS USE

(71) Applicant: Arkema France, Colombes (FR)

(72) Inventors: Pierre Gerard, Denguin (FR); Pierre Escale, Pau (FR); Raber Inoubli, Villeurbanne (FR); Philippe Hajji, Chatillon d'Azergues (FR)

(73) Assignee: Arkema France, Colombes (FR)

( * ) Notice: Subject to any disclaimer, the term of this patent is extended or adjusted under 35 U.S.C. 154(b) by 8 days.

This patent is subject to a terminal disclaimer.

(21) Appl. No.: 16/311,718

(22) PCT Filed: Jun. 23, 2017

(86) PCT No.: PCT/EP2017/065569
§ 371 (c)(1),
(2) Date: Dec. 20, 2018

(87) PCT Pub. No.: WO2017/220793
PCT Pub. Date: Dec. 28, 2017

(65) Prior Publication Data
US 2019/0203004 A1   Jul. 4, 2019

(30) Foreign Application Priority Data

Jun. 23, 2016 (FR) .................. FR16.55833

(51) Int. Cl.
| | | |
|---|---|---|
| *C08J 5/24* | (2006.01) | |
| *C08J 5/04* | (2006.01) | |
| *B32B 5/02* | (2006.01) | |
| *C09D 133/06* | (2006.01) | |
| *B32B 7/04* | (2019.01) | |
| *B29B 15/12* | (2006.01) | |
| *B32B 5/26* | (2006.01) | |
| *C08L 33/06* | (2006.01) | |
| *C08L 47/00* | (2006.01) | |
| *C08L 83/04* | (2006.01) | |
| *B29B 15/10* | (2006.01) | |

(52) U.S. Cl.
CPC .............. *C08J 5/24* (2013.01); *B29B 15/12* (2013.01); *B32B 5/022* (2013.01); *B32B 5/26* (2013.01); *B32B 7/04* (2013.01); *C08J 5/043* (2013.01); *C08L 33/066* (2013.01); *C08L 47/00* (2013.01); *C08L 83/04* (2013.01); *C09D 133/06* (2013.01); *B29B 15/105* (2013.01); *B32B 2255/02* (2013.01); *B32B 2260/021* (2013.01); *B32B 2260/023* (2013.01); *B32B 2260/046* (2013.01); *B32B 2262/02* (2013.01); *B32B 2262/0223* (2013.01); *B32B 2262/0253* (2013.01); *B32B 2262/0261* (2013.01); *B32B 2262/0269* (2013.01); *B32B 2262/0276* (2013.01); *B32B 2262/06* (2013.01); *B32B 2262/067* (2013.01); *B32B 2262/08* (2013.01); *B32B 2262/10* (2013.01); *B32B 2262/101* (2013.01); *B32B 2262/106* (2013.01); *B32B 2307/558* (2013.01); *B32B 2307/732* (2013.01); *B32B 2457/00* (2013.01); *B32B 2605/08* (2013.01); *B32B 2605/18* (2013.01); *C08J 2300/22* (2013.01); *C08J 2300/24* (2013.01); *C08J 2333/08* (2013.01); *C08J 2347/00* (2013.01); *C08J 2383/04* (2013.01); *C08J 2433/12* (2013.01); *C08J 2451/06* (2013.01); *C08L 2205/025* (2013.01); *C08L 2205/18* (2013.01); *C08L 2207/53* (2013.01)

(58) Field of Classification Search
CPC ......... C08J 5/24; C08J 5/043; C08L 2207/53; B29B 15/12; B29B 15/08; B29B 15/10
See application file for complete search history.

(56) References Cited

U.S. PATENT DOCUMENTS

| | | | | |
|---|---|---|---|---|
| 3,793,402 A | * | 2/1974 | Owens | .................. C08F 285/00 525/81 |
| 3,985,703 A | * | 10/1976 | Ferry | .................... C08F 265/04 523/201 |
| 4,119,746 A | | 10/1978 | Bleyle | |
| 6,616,971 B2 | | 9/2003 | Evans | |
| 2003/0054150 A1 | | 3/2003 | Evans | |

(Continued)

FOREIGN PATENT DOCUMENTS

| | | |
|---|---|---|
| JP | 2006182925 A | 7/2006 |
| JP | 3967810 | 8/2007 |

(Continued)

OTHER PUBLICATIONS

Gottfried W. Ehrenstein & Josef Kabelka, "Reinforced Plastics," in 31 Ullmann's Encyclopedia of Industrial Chemistry 453, published online 2010.*
Klaus Albrecht et al., "Polymethacrylates," in Ullmann's Encyclopedia of Industrial Chemistry, 15 pages, published online 2013.*

* cited by examiner

*Primary Examiner* — Nicholas E Hill
(74) *Attorney, Agent, or Firm* — Lynn B. Morreale

(57) ABSTRACT

The present invention relates to a composite preform comprising a multistage polymer. The present invention further relates to a method for making a composite preform comprising a fibrous material and a multistage polymer and its use in making composite articles. The present invention also relates to a process for preparing a composite preform comprising a fibrous material and a multistage polymer and its use for producing fibre reinforced impact modified composites.

15 Claims, No Drawings

(56) References Cited

U.S. PATENT DOCUMENTS

| | | |
|---|---|---|
| 2010/0267891 A1 | 10/2010 | Sakata et al. |
| 2012/0046416 A1 | 2/2012 | Pirri et al. |
| 2012/0264871 A1* | 10/2012 | Moon .................. C08F 283/12 |
| | | 524/537 |
| 2014/0038481 A1 | 2/2014 | Chen et al. |
| 2014/0058024 A1 | 2/2014 | Son et al. |
| 2015/0148451 A1* | 5/2015 | Harada .................. C08G 59/72 |
| | | 523/434 |
| 2015/0344649 A1 | 12/2015 | Sequeira |
| 2019/0010361 A1* | 1/2019 | Hoshi .................... C09J 163/00 |
| 2019/0233603 A1* | 8/2019 | Escale .................. C08F 265/06 |
| 2019/0248968 A1* | 8/2019 | Escale .................. B29B 15/105 |

FOREIGN PATENT DOCUMENTS

| | | | |
|---|---|---|---|
| WO | WO-2014022845 A1 * | 2/2014 | .............. C08J 5/043 |
| WO | WO 2014/125044 A1 | 8/2014 | |
| WO | WO-2014125044 A1 * | 8/2014 | ........... C08G 59/226 |
| WO | WO 2015/167881 A1 | 11/2015 | |
| WO | WO-2015167881 A1 * | 11/2015 | ............. B29B 13/06 |

PREFORM, ITS METHOD OF PREPARATION AND ITS USE

CROSS-REFERENCE TO RELATED APPLICATIONS

This application is a national stage application under 35 U.S.C. § 371 of PCT/EP2017/065569, filed Jun. 23, 2017 which claims benefit to application FR 16 55833, filed Jun. 23, 2016.

FIELD OF THE INVENTION

The present invention relates to a composite preform comprising a multistage polymer.

In particular the present invention it relates to a method for making a composite preform comprising a fibrous material and a multistage polymer and its use in making composite articles.

More particularly the present invention relates to a process for preparing a composite preform comprising a fibrous material and a multistage polymer and its use for producing fibre reinforced impact modified composites.

Technical Problem

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, and higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres (reinforcing material) or the other component which is wetted or impregnated with prepolymer and cured afterwards. Example for prepolymers or matrix material for thermoset polymers are unsaturated polyesters, vinylesters, epoxy or phenolic ones. After curing a thermoset composite cannot be reformed and stays in his predetermined shape.

Thermoplastic polymers consist of linear or branched polymers, which are not crosslinked. The thermoplastic polymers are heated in order to mix the constituents necessary for producing the composite material and to be cooled for setting. The limit in using thermoplastic polymers for the fabrication of composite materials is their high viscosity in the molten state in order to homogenously impregnating for example a fibrous substrate. The wetting or correct impregnation of the fibers by the thermoplastic polymer can only be achieved, if the thermoplastic resin is sufficiently fluid.

Another way for impregnating the fibrous substrate is to dissolve the thermoplastic polymer in an organic solvent Still another way for preparing a thermoplastic composite is impregnating the fibrous substrate with a liquid syrup that comprises a monomer and polymerization of said monomer.

Nevertheless many of the polymers used for the preparation of composite materials remain very fragile and do not have good mechanical properties, for instance impact strength. Although the fibrous substrate makes it possible to reinforce the mechanical properties of material by absorbing the energy due to an impact, since the matrix based on thermoplastic polymer is fragile, it cannot prevent the propagation of cracks, for example, and as such the final composite material still remains too fragile.

To improve the impact strength of a polymer, it is known practice to add an impact additive, which modifies the impact strength, comprising an elastomeric phase or rubber. Such a rubber can be part of a multistage polymer in form of core shell particles, with one stage that is a rubber or the elastomeric phase. These particles are prepared by emulsion polymerization to form a dispersion and can for example be recovered in powder form. They generally comprise a succession of "hard" and "soft" layers. Two-layer (soft-hard) or three-layer (hard-soft-hard) particles may thus be found. The particle size is generally less than 1 µm and more particularly between 50 nm and 500 nm.

The multistage polymer in form of core shell particles is available as agglomerated dry powder, the latter is dispersed in the matrix in order to obtain a homogeneous distribution of the initial core shell particles. For certain thermosetting polymers or resins, as especially epoxy resin, but also for thermoplastic polymers it is very difficult or nearly impossible to disperse correctly these multistage polymer particles.

Dispersing these usually weakly cross-linked discrete core shell particles in the liquid syrup or prepolymers in order to impregnate the fibrous reinforcement poses problems during the impregnation step. In fact the particles swell in the syrup which leads to gelation of the syrup. The viscosity is then too high and it is no longer possible to impregnate the fibrous substrate without defects appearing. To avoid this gelation phenomenon, the content of these particles in the resin must be limited to a very low content. However, such a content remains too low and does not conduct to the expected mechanical properties, especially as regards the impact strength.

The objective of the present invention is to obtain a stable preform that comprises a fibrous substrate and a multistage polymer.

An objective of the present invention is also to obtain a stable preform that comprises a fibrous substrate and a multistage polymer that can be used for producing an impact modified polymeric composites.

Another objective of the present invention is to find a method to introduce a multistage polymer in a polymeric composite material or mechanical or structured parts or articles comprising the polymeric composite material.

Still another objective of the present invention is a process to obtain a stable preform that comprises a fibrous substrate and a multistage polymer.

Still another objective of the present invention is a process to obtain quickly a stable preform that comprises a fibrous substrate and a multistage polymer.

Still another objective of the present invention is a process to obtain a stable preform that comprises a fibrous substrate and a multistage polymer, by using the less possible organic solvents or preferably without using organic solvents.

Still an additional objective is having a process for manufacturing an impact modified polymeric composite material or mechanical or structured parts or articles comprising the impact modified polymeric composite material.

BACKGROUND OF THE INVENTION

Prior Art

The document discloses EP1312453 discloses composite articles including prepregs, preforms, laminates and sandwich moldings and methods of making the same. In particularly a strand of a plurality of fibres coated with polymer particles is disclosed that have an average diameter of less than 5 μm. The polymer particle is a thermoplastic polymer or a crosslinked thermoplastic polymer. Polymer particles of small size with between 0.1 μm to 0.25 μm having high molecular weights of at least 10,000 g/mol are mentioned.

None of the prior art documents discloses a preform or it process of preparation according to the invention.

Brief Description of the Invention

Surprisingly it has been found that a preform comprising
a) a fibrous substrate and
b) a multi stage polymer,
wherein the quantity of multi stage polymer in the preform is between 3 wt % and 50 wt %, keeps its shape.

Surprisingly it has also been found that a preform comprising
a) a fibrous substrate and
b) a multi stage polymer,
wherein the quantity of multi stage polymer in the preform is between 3 wt % and 50 wt %, can be used for manufacturing a polymeric composite material or mechanical or structured parts or articles comprising the polymeric composite material.

Surprisingly it has also been found that a process for manufacturing a preform comprising the steps of
a) bringing into contact a fibrous substrate and an aqueous dispersion of a multistage polymer
b) drying the product of step a),
c) heating the dried product of b),
wherein the quantity of multi stage polymer in the preform is between 3 wt % and 50 wt % yields to a preform that keeps its shape.

DETAILED DESCRIPTION OF THE INVENTION

According to a first aspect, the present invention relates to preform comprising
a) a fibrous substrate and
b) a multi stage polymer,
wherein the quantity of multi stage polymer in the preform is between 3 wt % and 50 wt %.

According to a second aspect, the present invention relates to a process for manufacturing a preform comprising the steps
a) bringing into contact a fibrous substrate and an aqueous dispersion of a multistage polymer
b) drying the product of step a),
c) heating the dried product of b),
wherein the quantity of multi stage polymer in the preform is between 3 wt % and 50 wt %.

In a third aspect the present invention relates to the use of a preform comprising
a) a fibrous substrate and
b) a multi stage polymer,
wherein the quantity of multi stage polymer in the preform is between 3 wt % and 50 wt % for manufacturing a polymeric composite material or mechanical or structured parts or articles comprising the polymeric composite material By the term "polymer powder" as used is denoted a polymer comprising powder grains in the range of at least 1 micrometer (μm) obtained by agglomeration of primary polymer or polymers or oligomers comprising particles in the nanometer range.

By the term "primary particle" as used is denoted a spherical polymer comprising particles in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

By the term "preform" as used is denoted a pre-shaped fibrous reinforcement, well known in composite manufacturing. The initial aspect of for example a fibrous mat as fibrous reinforcement, which is flexible, is kept in a certain already fixed shape by for example the polymer. The shape of a more complex preform corresponds to the later component geometry, where the individual fiber orientations are fixed in the layers by a suitable binder. It is a fiber semi-finished products that essentially already has the necessary outer contours a preform, which is rigid enough to be fully automated and accurately placed. The preform is finished by adding for example a resin or impregnating the preform with a resin, which is polymerized in order to obtain the finished composite or structured article.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The preform according to the invention is comprising a fibrous substrate and a multi stage polymer, wherein the quantity of multi stage polymer in the preform is between 3 wt % and 50 wt %.

Preferably the quantity of multi stage polymer in the preform is at least 4 wt %, more preferably at least 5 wt % and advantageously at least 6 wt %, and most advantageously at least 7 wt %, based on the sum of the two compounds a) and b).

Preferably the quantity of multi stage polymer in the preform is at most 40 wt %, more preferably at most 30 wt % and advantageously at most 25 wt %, based on the sum of the two compounds a) and b).

Preferably the quantity of multi stage polymer in the preform is between is between 4 wt % and 40 wt % and more preferably between 5 wt % and 30 wt % and advantageously between 6 wt % and 25 wt % and advantageously between 7 wt % and 25 wt %, based on the sum of the two compounds a) and b).

The multistage polymer according to the invention has at least two stages that are different in its polymer composition.

The multistage polymer is preferably in form of spherical polymer particles. These particles are also called core shell particles. The first stage forms the core, the second or all following stages the respective shells.

With regard to the spherical polymer particle, it has a weight average particle size between 20 nm and 800 nm. Preferably the weight average particle size of the polymer is between 25 nm and 600 nm, more preferably between 30 nm and 550 nm, still more preferably between 35 nm and 500 nm, advantageously between 40 nm and 400 nm, more advantageously between 50 nm and 400 nm, still more advantageously between 75 nm and 350 nm and most advantageously between 80 nm and 300 nm.

The polymer particle has a multilayer structure comprising at least one layer (A) comprising a polymer (A1) having a glass transition temperature below 0° C. and another layer (B) comprising a polymer (B1) having a glass transition temperature over 30° C. Preferably the polymer (B1) having a glass transition temperature over 30° C. is the external layer of the polymer particle having the multilayer structure. Preferably the stage (A) is the first stage and the stage (B) comprising polymer (B1) is grafted on stage (A) comprising polymer (A1).

The polymer particle is obtained by a multistage process such as a process comprising two, three or more stages. The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process for the core for the polymer particle having the multilayer structure. Preferably the polymer (A1) is having a glass transition temperature below −5° C., more preferably below −15° C., advantageously below −25° C.

Preferably the polymer (B1) having a glass transition temperature over 30° C. is made in the last stage of the multistage process forming the external layer of the polymer particle having the multilayer structure.

There could be additional intermediate layer or layers obtained by an intermediate stage or intermediate stages.

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers of the multistage polymer can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

In a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

In a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 70 wt % of monomer units coming from methyl methacrylate.

Preferably the glass transition temperature Tg of the polymer (B1) is between 30° C. and 150° C. The glass transition temperature of the polymer (B1) is more preferably between 60° C. and 150° C., still more preferably between 80° C. and 150° C., advantageously between 90° C. and 150° C. and more advantageously between 100° C. and 150° C.

With regard to the process for manufacturing the multistage polymer according to the invention, it comprises the steps of
  a) polymerizing by emulsion polymerization of a monomer or monomers mixture ($A_m$) to obtain one layer (A) comprising polymer (A1) having a glass transition temperature of less then 0° C.
  b) polymerizing by emulsion polymerization of a monomer or monomers mixture ($B_m$) to obtain layer (B) comprising a polymer (B1) having a glass transition temperature of at least 30° C.
the monomer or monomers mixture ($A_m$) and the monomer or monomers mixture ($B_m$) are chosen from respective monomers according to the composition for polymer (A1) and polymer (B1) given earlier.

Preferably the step a) is made before step b). More preferably step b) is performed in presence of the polymer (A1) obtained in step a), if there are only two stages.

Still more preferably a graftlinking compound is used in order to graft at least a part of the polymer (B1) of step b) on the polymer (A1) of step a).

Advantageously the process for manufacturing the multistage polymer composition according to the invention is a multistep process comprises the steps one after the other of
  a) polymerizing by emulsion polymerization of a monomer or monomers mixture ($A_m$) to obtain one layer (A) comprising polymer (A1) having a glass transition temperature of less then 0° C.
  b) polymerizing by emulsion polymerization of a monomer or monomers mixture ($B_m$) to obtain layer (B) comprising a polymer (B1) having a glass transition temperature of at least 30° C.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

Still more advantageously a graftlinking compound is used in order to graft at least a part of the polymer (B1) of step b) on the polymer (A1) of step a).

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the fibrous substrate, one can mention fabrics, felts or nonwovens that may be in the form of strips, laps, braids, locks or pieces. The fibrous material can have different forms and dimensions either one dimensional, two dimensional or three dimensional. A fibrous substrate comprises an assembly of one or more fibres. When thefibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non-woven reinforcements or woven roving or bundles of fibers, which can also be braided.

The three dimensional form are for example stacked or folded fibrous mats or non-woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsatured polyesters, epoxy resins and vinylesters.

The mineral fibers can also be chosen from glass fibers especially of type E, R or S2, carbon fibers, boron fibers or silica fibers.

The fibrous substrate of the present invention is chosen from vegetable fibers, wood fibers, animal fibers, mineral fibers, synthetic polymeric fibers, glass fibers, carbon fibers or mixtures thereof.

Preferably the fibrous substrate is two or three dimensional.

With regard to the process for manufacturing the preform according to the invention, it comprises the steps of
a) bringing into contact a fibrous substrate and an aqueous dispersion of a multistage polymer
b) drying the product of step a),
c) heating the dried product of b),
wherein the quantity of the multistage polymer in the preform is between 3 wt % and 50 wt %.

The step a) of said process can be made by dipping, infusion or impregnation of the fibrous substrate with the aqueous dispersion comprising a multistage polymer.

The step b) is made by evaporation of the aqueous phase or by slightly heating. Preferably step b) is made by heating to at least 45° C.

The step c) is made in a mold at a temperature between 100° C. and 250° C. Preferably between 125° C. and 225° C. The mold can be under pressure The process for manufacturing the preform can also comprise the step of transforming the preform. This can either be made during step c), that the heating take place in a mold with a certain form, or that the preform is transformed to another form under heating again after step c).

The preform of the invention can be used to manufacture polymeric composite material or mechanical or structured parts or articles comprising the polymeric composite material.

The preform of the invention is used in a process like infusion, vacuum bag moulding, pressure bag molding, autoclave molding, resin transfer moulding (RTM), reaction injection molding (RIM) reinforced reaction injection molding (R-RIM) and variants thereof, press molding or compression molding.

Preferably the process is resin transfer moulding.

During this process a matrix or continuous phase is added to the preform and an impact modified polymeric composite material or mechanical or structured parts or articles comprising the polymeric composite material is obtained.

The matrix or continuous phase of the polymeric composite material is a thermoset polymer or a thermoplastic polymer.

As an example the process for manufacturing the impact modified polymeric composite material is made by a moulding process. The processes generally involve the steps of shaping the preform to match the contours of a mold, placing the shaped preform into a mold, injecting an uncured or melted molding resin or to be polymerized syrup into the mold, and then curing or cooling the molding resin or polymerizing as needed to form a solid molded polymer composite.

Methods of Evaluation

Particle Size Analysis

The particle size of the primary particles after the multistage polymerization is measured with a Zetasizer Nano S90 from MALVERN. The particle size of the polymer powder is measured with Malvern Mastersizer 3000 from MALVERN. For the estimation of volume median particle size D50 a Malvern Mastersizer 3000 apparatus with a 300 mm lenses, measuring a range from 0.5-880 μm is used.

Glass Transition Temperature

The glass transitions (Tg) of the multistage polymers is measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

EXAMPLES

Following materials are used or prepared:

A fibrous substrate in form of a glass fibre fabric is used.

As multistage polymer a polymeric impact modifier is prepared according to the technique described in U.S. Pat. No. 4,278,576, which employs a standard emulsion polymerization technique.

As polymeric impact modifier (IM1) a core/shell acrylic polymer impact modifier is prepared by a multistage process employing 89.2 parts of butyl acrylate, 0.4 parts of butylene glycol diacrylate and 0.4 parts of diallymaleate as elastomeric core, followed by a polymerization of 10 parts of methyl methacrylate. The solid content is 40% of the aqueous dispersion of (IM1).

The glass fibre fabric is dipped several times in the aqueous dispersion of (IM1) in order to soak the fabric. The number of dipping steps is varied in order to have different quantities of multistage polymer (IM1) from the dispersion on the fabric.

The fabric is dried in an oven at 50° C.

The quantity of the multistage polymer in the fabric is calculated by weighting the fabric before the dipping and after drying.

Following products are obtained:

Example 1: The multistage polymer (IM1) is at 7 wt % in the fabric.

Example 2: The multistage polymer (IM1) is at 12 wt % in the fabric.

Comparative example 1: The multistage polymer (IM1) is at 3 wt % in the fabric.

Three layers of each fabric or ply are stacked in order to obtain a thickness of about 1 mm. The stack is put into a mould under pressure and the temperature is increased during 10 min from 20° C. up to 200°. The 200° C. are held for 15 min, then the mould is cooled down to 70° C. during 25 min and the preform is removed from the mold.

The cohesion between the ply's is sufficient for making a preform. The preforms made with examples 1 and 2, keep their form for several weeks and can be used as preforms.

Comparative example 2: The aqueous dispersion of (IM1) was recovered, the polymer composition being dried by spray drying. The obtained polymer composition is mixed with methyl ethyl ketone (MEK) at 20° C. under agitation so that 40 wt % of IM1 relatively to MEK are in the composition comprising the multistage polymer IM1. The obtained mixture is not liquid due to swelling of multistage polymer IM1.

Comparative example 3: The aqueous dispersion of (IM1) was recovered, the polymer composition being dried by spray drying. The obtained polymer composition is mixed with methyl ethyl ketone (MEK) at 20° C. under agitation so that 5 wt % of IM1 relatively to MEK are in the composition comprising the multistage polymer IM1. The obtained mixture becomes viscous due to swelling of multistage polymer IM1. The glass fibre fabric is dipped several times into the mixture in order to soak the fabric. After the same number of dipping steps the quantity of multistage polymer (IM1) on the fabric is less important than with the aqueous dispersion of (IM1). Additionally the solvent evaporates and smells.

The invention claimed is:

1. A stable, pre-shaped, unfinished preform comprising:
   a) a fibrous substrate and
   b) a multi stage core shell polymer having at least two stages that are different from each other in polymer composition, and
   c) which does not include a matrix of polymerizable continuous phase impregnating resin,
   wherein the quantity of multi stage polymer is between 5 wt % and 30 wt % of the preform, and wherein the pre-shaped, unfinished preform is stable such that it has a fixed shape in the absence of said matrix of polymerizable continuous phase impregnating resin in the preform.

2. The stable, pre-shaped, unfinished preform according to claim 1 wherein the quantity of said multi stage core shell polymer is between 6 wt % and 25 wt %.

3. The stable, pre-shaped, unfinished preform according to claim 1 wherein the quantity of said multi stage core shell polymer is at least 7 wt %, based on the sum of the two compounds a) and b).

4. The stable, pre-shaped, unfinished preform according to claim 1 wherein the quantity of said multi stage core shell polymer is between 7 wt % and 25 wt %, based on the sum of the two compounds a) and b).

5. The stable, pre-shaped, unfinished preform according to claim 1 wherein the multistage core shell polymer is in form of spherical polymer particles having a weight average particle size between 20 nm and 800 nm.

6. The stable, pre-shaped, unfinished preform according to claim 1 wherein the multi stage core shell polymer comprises,
   a) one stage (A) comprising a polymer (A1) having a glass transition temperature of less then 0° C., and
   b), one stage (B) comprising a polymer (B1) having a glass transition temperature of at least 30° C.

7. The stable, pre-shaped, unfinished preform according to claim 6 wherein the polymers (A1) and (B1) are acrylic or methacrylic polymers.

8. The stable, pre-shaped, unfinished preform according to claim 6 wherein the polymer (A1) is a silicone rubber based polymer.

9. The stable, pre-shaped, unfinished preform according to claim 6 wherein the polymers (A1) comprises at least 50 wt % of polymeric units coming from isoprene or butadiene.

10. The stable, pre-shaped, unfinished preform according to claim 6 wherein stage (A) is the first stage and stage (B) comprising polymer (B1) is grafted on stage (A) comprising polymer (A1).

11. The stable, pre-shaped, unfinished preform according to claim 1 wherein the fibrous substrate comprises fibers having an aspect ratio of at least 1000.

12. The stable, pre-shaped, unfinished preform according to claim 1 wherein the fibrous substrate is chosen from the group consisting of stacked or folded fibrous mats, nonwoven reinforcements, bundles of fibers, and mixtures thereof.

13. A process for manufacturing the stable, pre-shaped, unfinished preform according to claim 1, said process comprising the steps of:
   a) bringing into contact the fibrous substrate and an aqueous dispersion of the multistage core shell polymer,
   b) drying the product of step a), and
   c) heating the dried product of b) in a mold at a temperature between 100° C. and 250° C.

14. The process according to claim 13 wherein step b) is made by heating to at least 45° C.

15. The process according to claim 13 wherein step c) is made in a mold at a temperature between 100° C. and 250° C.

* * * * *